US012609064B2

(12) United States Patent
Huang et al.

(10) Patent No.: US 12,609,064 B2
(45) Date of Patent: Apr. 21, 2026

(54) DRIVING CIRCUIT, DRIVING METHOD AND DISPLAY DEVICE

(71) Applicants: CHENGDU BOE OPTOELECTRONICS TECHNOLOGY CO., LTD., Chengdu (CN); BOE TECHNOLOGY GROUP CO., LTD., Beijing (CN); Beijing BOE Technology Development Co., Ltd., Beijing (CN)

(72) Inventors: Yao Huang, Beijing (CN); Mengmeng Du, Beijing (CN); Xiangdan Dong, Beijing (CN); Ming Hu, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/995,315

(22) PCT Filed: May 23, 2024

(86) PCT No.: PCT/CN2024/094816

§ 371 (c)(1),
(2) Date: Jan. 16, 2025

(87) PCT Pub. No.: WO2024/260207

PCT Pub. Date: Dec. 26, 2024

(65) Prior Publication Data

US 2026/0038404 A1 Feb. 5, 2026

(30) Foreign Application Priority Data

Jun. 21, 2023 (CN) ........................ 202310744273.6

(51) Int. Cl.
*G09G 3/20* (2006.01)

(52) U.S. Cl.
CPC ....... *G09G 3/20* (2013.01); *G09G 2300/0426* (2013.01); *G09G 2310/08* (2013.01); *G09G 2330/02* (2013.01)

(58) Field of Classification Search
None
See application file for complete search history.

(56) References Cited

U.S. PATENT DOCUMENTS

| | | | | |
|---|---|---|---|---|
| 12,361,873 B2 * | 7/2025 | Ren | ...................... | G09G 3/3233 |
| 2008/0157744 A1 * | 7/2008 | Jinta | ...................... | H02M 3/07 323/284 |

(Continued)

FOREIGN PATENT DOCUMENTS

| | | |
|---|---|---|
| CN | 110197646 A | 9/2019 |
| CN | 113436585 A | 9/2021 |

(Continued)

*Primary Examiner* — Duane N Taylor, Jr.
(74) *Attorney, Agent, or Firm* — WHDA, LLP

(57) ABSTRACT

The present disclosure provides a driving circuit, a driving method and a display device. The driving circuit includes a first node control circuit, a second node control circuit and an output circuit. Under control of a first clock signal, the first node control circuit controls connection between the first node and the first voltage terminal to be on, and controls connection between the first node and the second voltage terminal to be on. Under control of a control signal, the second node control circuit controls the connection between the second node and the first voltage terminal to be on. Under control of the potential of the first node and the potential of the second node, the output circuit controls a driving output terminal to output a driving signal. The present disclosure can meet the requirements of pixel driving while simplifying the circuit.

20 Claims, 7 Drawing Sheets

(56) References Cited

U.S. PATENT DOCUMENTS

| | | | | |
|---|---|---|---|---|
| 2011/0069806 | A1 | 3/2011 | Liao et al. | |
| 2021/0065643 | A1* | 3/2021 | Zheng | G09G 3/3677 |

FOREIGN PATENT DOCUMENTS

| | | | |
|---|---|---|---|
| CN | 114974079 | A | 8/2022 |
| CN | 116825015 | A | 9/2023 |
| KR | 20080044458 | A | 5/2008 |

* cited by examiner

DRIVING CIRCUIT, DRIVING METHOD AND DISPLAY DEVICE

CROSS-REFERENCE TO RELATED APPLICATION

The present disclosure is the U.S. national phase of PCT Application No. PCT/CN2024/094816 filed on May 23, 2024, which claims the priority of Chinese Application No. 202310744273.6, filed on Jun. 21, 2023, the disclosure of which is incorporated in its entirety by reference herein.

TECHNICAL FIELD

The present disclosure relates to the field of display technologies, and in particular to a driving circuit, a driving method and a display device.

BACKGROUND

In the related art, a driving circuit is an 8T2C driving circuit including a large number of transistors and capacitors, which is not conducive to achieving a narrow frame and saving costs. The related art cannot meet requirements of pixel driving while simplifying the driving circuit.

SUMMARY

In a first aspect, one embodiment of the present disclosure provides a driving circuit, including: a first node control circuit, a second node control circuit and an output circuit;

wherein the first node control circuit is electrically connected to a first node, a first clock signal terminal, a first voltage terminal and a second voltage terminal, respectively, and is used to, under control of a first clock signal provided by the first clock signal terminal, control connection between the first node and the first voltage terminal to be on, and is used to, under control of the first clock signal, control connection between the first node and the second voltage terminal to be on;

the second node control circuit is electrically connected to a second node, an input terminal, the first voltage terminal, a control terminal and a third voltage terminal, respectively, and is used to, under control of an input signal provided by the input terminal, control connection between the second node and the first voltage terminal to be on, and is used to, under control of a control signal provided by the control terminal, control connection between the second node and the third voltage terminal to be on;

the output circuit is electrically connected to the first node, the second node and a driving output terminal, respectively; and is used to, under control of a potential of the first node and a potential of the second node, control the driving output terminal to output a driving signal.

Optionally, the output circuit is further electrically connected to a second voltage terminal and a second clock signal terminal, respectively, and is used to, under control of the potential of the first node, control connection between the driving output terminal and the second voltage terminal, and is used to, under control of the potential of the second node, control connection between the driving output terminal and the second clock signal terminal.

Optionally, the driving circuit in at least one embodiment of the present disclosure further includes an energy storage circuit;

wherein the energy storage circuit is electrically connected to the second node and the driving output terminal respectively, and is used to store electric energy.

Optionally, the control terminal is a first reset terminal; the first reset terminal is electrically connected to adjacent next n-stage driving output terminals, and n is a positive integer.

Optionally, the control terminal is a second reset terminal;

the second reset terminal is used to provide a valid voltage signal in at least two reset time periods included in a reset phase, thereby enabling the second node control circuit to control, under control of a second reset signal provided by the second reset terminal, the connection between the second node and the third voltage terminal to be on.

Optionally, the first node control circuit includes a first transistor and a second transistor;

a gate electrode of the first transistor is electrically connected to the first clock signal terminal, a first electrode of the first transistor is electrically connected to the first voltage terminal, and a second electrode of the first transistor is electrically connected to the first node;

a gate electrode of the second transistor is electrically connected to the first clock signal terminal, a first electrode of the second transistor is electrically connected to the second voltage terminal, and a second electrode of the second transistor is electrically connected to the first node;

the first transistor is a p-type transistor, and the second transistor is an n-type transistor; or, the first transistor is an n-type transistor, and the second transistor is a p-type transistor.

Optionally, the second node control circuit includes a third transistor and a fourth transistor;

a gate electrode of the third transistor is electrically connected to the input terminal, a first electrode of the third transistor is electrically connected to the first voltage terminal, and a second electrode of the third transistor is electrically connected to the second node;

a gate electrode of the fourth transistor is electrically connected to the first reset terminal, a first electrode of the fourth transistor is electrically connected to the third voltage terminal, and a second electrode of the fourth transistor is electrically connected to the second node.

Optionally, the second node control circuit includes a third transistor and a fourth transistor;

a gate electrode of the third transistor is electrically connected to the input terminal, a first electrode of the third transistor is electrically connected to the first voltage terminal, and a second electrode of the third transistor is electrically connected to the second node;

a gate electrode of the fourth transistor is electrically connected to the second reset terminal, a first electrode of the fourth transistor is electrically connected to the third voltage terminal, and a second electrode of the fourth transistor is electrically connected to the second node.

Optionally, the output circuit includes a fifth transistor and a sixth transistor;

a gate electrode of the fifth transistor is electrically connected to the first node, a first electrode of the fifth transistor is electrically connected to the second voltage terminal, and a second electrode of the fifth transistor is electrically connected to the driving output terminal;

a gate electrode of the sixth transistor is electrically connected to the second node, a first electrode of the sixth transistor is electrically connected to the driving output terminal, and a second electrode of the sixth transistor is electrically connected to the second clock signal terminal.

Optionally, the sixth transistor is a p-type transistor, and a voltage value of a third voltage signal provided by the third voltage terminal is greater than a voltage value of a second voltage signal provided by the second voltage terminal; or, the sixth transistor is an n-type transistor, and a voltage value of a third voltage signal provided by the third voltage terminal is smaller than a voltage value of a second voltage signal provided by the second voltage terminal.

Optionally, the energy storage circuit includes a storage capacitor:

a first terminal of the storage capacitor is electrically connected to the second node, and a second voltage terminal of the storage capacitor is electrically connected to the driving output terminal.

Optionally, the driving circuit in at least one embodiment of the present disclosure further includes a seventh transistor; wherein the output circuit is electrically connected to the first node through the seventh transistor;

a gate electrode of the seventh transistor is electrically connected to a fourth voltage terminal, a first electrode of the seventh transistor is electrically connected to the first node, and a second electrode of the seventh transistor is electrically connected to the output circuit.

In a second aspect, one embodiment of the present disclosure provides a driving method, applied to the above driving circuit, and the driving method includes:

controlling, by the first node control circuit, under control of a first clock signal, connection between the first node and the first voltage terminal to be on; controlling, by the first node control circuit, under control of the first clock signal, connection between the first node and the second voltage terminal to be on;

controlling, by the second node control circuit, under control of an input signal, connection between the second node and the first voltage terminal to be on; controlling, by the second node control circuit, under control of a control signal, connection between the second node and the third voltage terminal to be on;

controlling, by the output circuit, under control of a potential of the first node and a potential of the second node, the driving output terminal to output a driving signal.

Optionally, the step of controlling, by the output circuit, under control of a potential of the first node and a potential of the second node, the driving output terminal to output a driving signal, includes:

controlling, by the output circuit, under control of the potential of the first node, connection between the driving output terminal and the second voltage terminal to be on; controlling, by the output circuit, under control of the potential of the second node, connection between the driving output terminal and the second clock signal terminal to be on.

In third second aspect, one embodiment of the present disclosure provides a display device, including the above driving circuit.

The driving circuit in one embodiment of the present disclosure adopts a very simple structure, which can meet requirements of pixel driving while simplifying the circuit. Meanwhile, the simplified circuit and its driving capability, as well as process margin are equivalent to the existing mass-produced driving circuit, and conducive to achieving a narrow frame and saving costs.

DETAILED DESCRIPTION

The technical solutions in the embodiments of the present disclosure will be clearly and completely described hereinafter in conjunction with the accompanying drawings in the embodiments of the present disclosure. Obviously, the described embodiments are only a part of the embodiments of the present disclosure, rather than all the embodiments. Based on the embodiments in the present disclosure, all other embodiments obtained by those of ordinary skill in the art without creative work shall fall within the protection scope of the present disclosure.

The transistors used in all the embodiments of the present disclosure may be thin film transistors, field effect transistors or other devices with the same characteristics. In the embodiments of the present disclosure, in order to distinguish two electrodes of the transistor other than the gate, one of the electrodes is referred to as a first electrode, and the other electrode is referred to as a second electrode.

In actual operation, when the transistor is a thin film transistor or a field effect transistor, the first electrode may be a drain electrode, and the second electrode may be a source electrode, or the first electrode may be a source electrode, and the second electrode may be a drain electrode.

Figure 1:
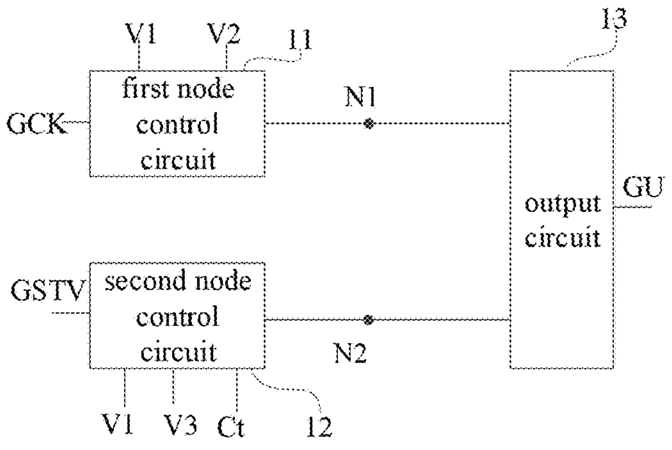
FIG. 1 is a schematic diagram of a driving circuit according to an embodiment of the present disclosure.

As shown in FIG. 1, a driving circuit according to an embodiment of the present disclosure includes a first node control circuit 11, a second node control circuit 12, and an output circuit 13.

The first node control circuit 11 is electrically connected to a first node N1, a first clock signal terminal GCK, a first voltage terminal V1 and a second voltage terminal V2, respectively; and is used to, under control of a first clock signal provided by the first clock signal terminal GCK, control connection between the first node N1 and the first voltage terminal V1 to be on, and is used to, under control of the first clock signal, control connection between the first node N1 and the second voltage terminal V2 to be on.

The second node control circuit 12 is electrically connected to a second node N2, an input terminal GSTV, the first voltage terminal V1, a control terminal Ct and a third voltage terminal V3, respectively; and is used to, under control of an input signal provided by the input terminal GSTV, control connection between the second node N2 and the first voltage terminal V1 to be on, and is used to, under control of a control signal provided by the control terminal Ct, control connection between the second node N2 and the third voltage terminal V3 to be on.

The output circuit 13 is electrically connected to the first node N1, the second node N2 and a driving output terminal GU, respectively; and is used to, under control of a potential of the first node N1 and a potential of the second node N2, control the driving output terminal GU to output a driving signal.

In the related art, a driving circuit is an 8T2C driving circuit including a large number of transistors and capacitors. The driving circuit in at least one embodiment of the present disclosure adopts a very simple structure, which can meet requirements of pixel driving while simplifying the circuit. Meanwhile, the simplified circuit and its driving capability, as well as process margin are equivalent to the existing mass-produced driving circuit.

In at least one embodiment of the present disclosure, the output circuit is further electrically connected to a second voltage terminal and a second clock signal terminal, respectively; and is used to, under control of the potential of the first node, control connection between the driving output terminal and the second voltage terminal, and is used to, under control of the potential of the second node, control connection between the driving output terminal and the second clock signal terminal.

In a specific implementation, under control of the potential of the first node, the output circuit can control the connection between the driving output terminal and the second voltage terminal to be on; and under control of the potential of the second node, control the connection between the driving output terminal and the second clock signal terminal to be on.

Figure 2:
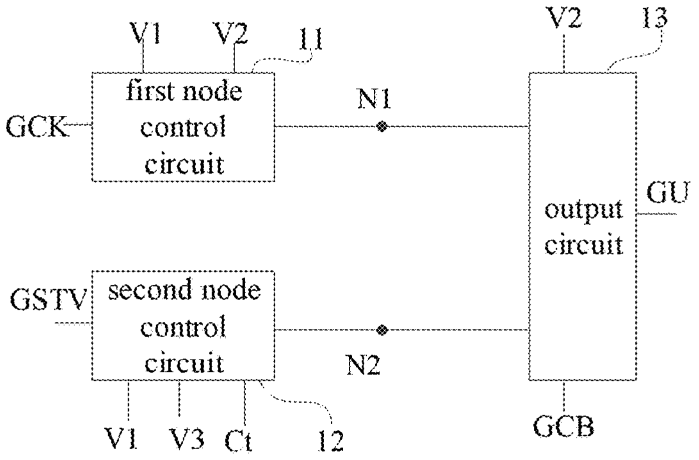
FIG. 2 is a schematic diagram of a driving circuit according to at least one embodiment of the present disclosure.

As shown in FIG. 2, on the basis of the embodiment of the driving circuit shown in FIG. 1, the output circuit is further electrically connected to a second voltage terminal V2 and a second clock signal terminal GCB, respectively; and is used to, under control of the potential of the first node N1, control connection between the driving output terminal GU and the second voltage terminal V2 to be on, and is used to, under control of the potential of the second node N2, control connection between the driving output terminal GU and the second clock signal terminal GCB to be on.

The driving circuit in at least one embodiment of the present disclosure further includes an energy storage circuit.

The energy storage circuit is electrically connected to the second node and the driving output terminal, respectively, and is used to store electric energy.

In a specific implementation, the driving circuit may further include an energy storage circuit.

The energy storage circuit is used to control the potential of the second node according to a driving signal provided by the driving output terminal.

Figure 3:
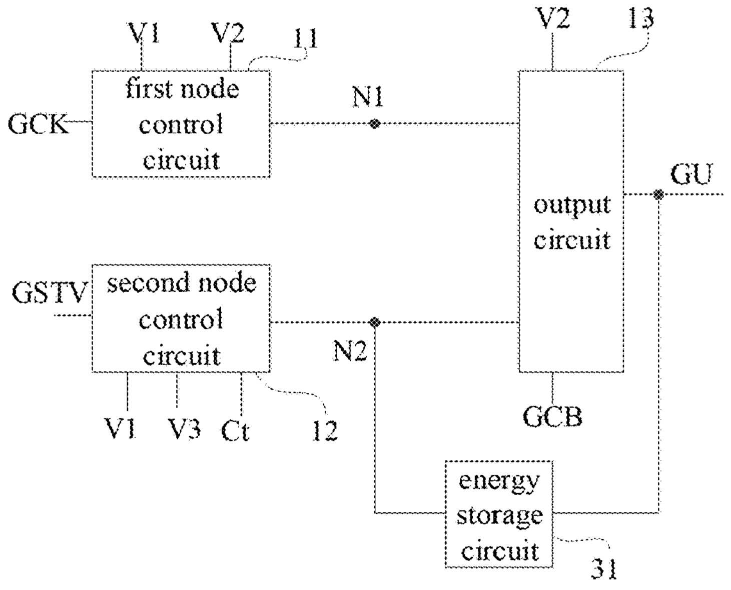
FIG. 3 is a schematic diagram of a driving circuit according to at least one embodiment of the present disclosure.

As shown in FIG. 3, on the basis of the embodiment of the driving circuit shown in FIG. 2, the driving circuit according to at least one embodiment of the present disclosure further includes an energy storage circuit 31.

The energy storage circuit 31 is electrically connected to the second node N2 and the driving output terminal GU, respectively, and is used to store electric energy.

In at least one embodiment of the present disclosure, the control terminal is a first reset terminal. The first reset terminal is electrically connected to adjacent next n-stage driving output terminals, where n is a positive integer.

Optionally, n may be equal to 1, but is not limited thereto. In actual operation, n may also be an integer greater than 1.

Figure 4:
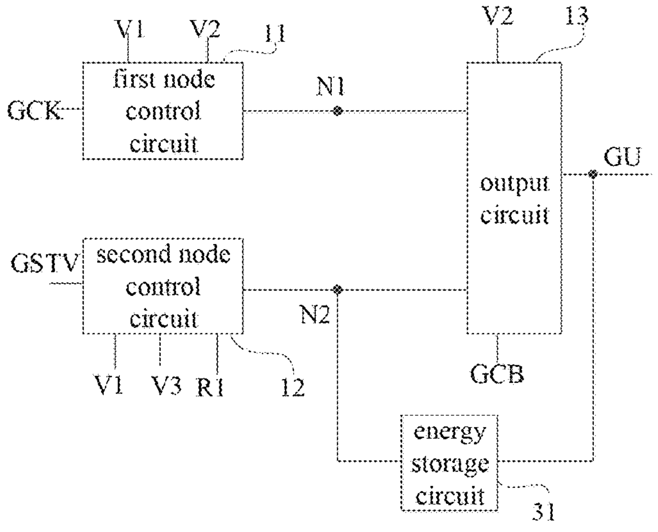
FIG. 4 is a schematic diagram of a driving circuit according to at least one embodiment of the present disclosure.

As shown in FIG. 4, on the basis of the embodiment of the driving circuit shown in FIG. 3, the control terminal is a first reset terminal R1.

The first reset terminal R1 is electrically connected to an adjacent next-stage driving output terminal.

In at least one embodiment of the present disclosure, the control terminal is a second reset terminal.

The second reset terminal is used to provide a valid voltage signal in at least two reset time periods included in a reset phase, so that under control of a second reset signal provided by the second reset terminal, the second node control circuit controls the connection between the second node and the third voltage terminal to be on.

In a specific implementation, the control terminal may be a second reset terminal; under control of a second reset signal in at least two reset time periods included in the reset phase, the second node control circuit may control the connection between the second node and the third voltage terminal to be on.

Figure 5:
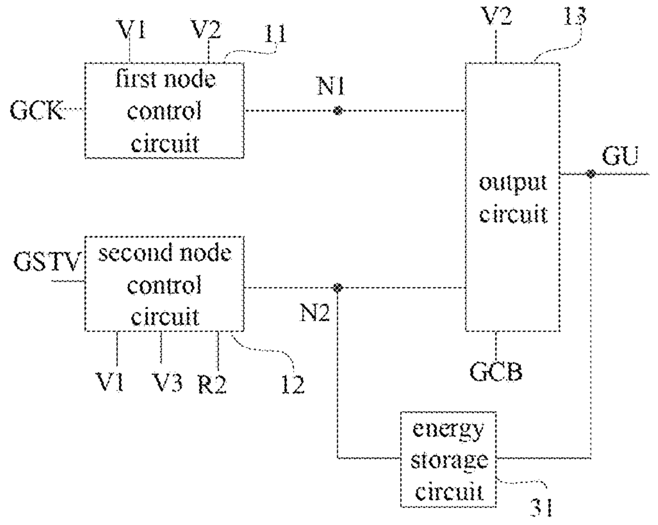
FIG. 5 is a schematic diagram of a driving circuit according to at least one embodiment of the present disclosure.

As shown in FIG. 5, on the basis of the embodiment of the driving circuit shown in FIG. 3, the control terminal is a second reset terminal R2.

The second reset terminal R2 is used to provide a valid voltage signal in at least two reset time periods included in the reset phase, so that under control of a second reset signal provided by the second reset terminal R2, the second node control circuit 12 controls the connection between the second node N2 and the third voltage terminal V3 to be on.

In a specific implementation, when a transistor whose gate electrode is electrically connected to the second reset terminal R2, included in the second node control circuit 12, is a p-type transistor, the valid voltage signal is a low voltage signal; when the transistor whose gate electrode is electrically connected to the second reset terminal R2, included in the second node control circuit 12, is an n-type transistor, the valid voltage signal is a high voltage signal.

In at least one embodiment of the present disclosure, the second reset signal provided by the second reset terminal may be a high-frequency reset signal, so as to achieve a better effect of resetting the potential of the second node.

Optionally, the first node control circuit includes a first transistor and a second transistor.

A gate electrode of the first transistor is electrically connected to the first clock signal terminal, a first electrode of the first transistor is electrically connected to the first voltage terminal, and a second electrode of the first transistor is electrically connected to the first node.

A gate electrode of the second transistor is electrically connected to the first clock signal terminal, a first electrode of the second transistor is electrically connected to the second voltage terminal, and a second electrode of the second transistor is electrically connected to the first node.

The first transistor is a p-type transistor, and the second transistor is an n-type transistor; or, the first transistor is an n-type transistor, and the second transistor is a p-type transistor.

Optionally, the second node control circuit includes a third transistor and a fourth transistor.

A gate electrode of the third transistor is electrically connected to the input terminal, a first electrode of the third transistor is electrically connected to the first voltage terminal, and a second electrode of the third transistor is electrically connected to the second node.

A gate electrode of the fourth transistor is electrically connected to the first reset terminal, a first electrode of the fourth transistor is electrically connected to the third voltage terminal, and a second electrode of the fourth transistor is electrically connected to the second node.

Optionally, the second node control circuit includes a third transistor and a fourth transistor.

A gate electrode of the third transistor is electrically connected to the input terminal, a first electrode of the third transistor is electrically connected to the first voltage terminal, and a second electrode of the third transistor is electrically connected to the second node.

A gate electrode of the fourth transistor is electrically connected to the second reset terminal, a first electrode of the fourth transistor is electrically connected to the third voltage terminal, and a second electrode of the fourth transistor is electrically connected to the second node.

Optionally, the output circuit includes a fifth transistor and a sixth transistor.

A gate electrode of the fifth transistor is electrically connected to the first node, a first electrode of the fifth transistor is electrically connected to the second voltage terminal, and a second electrode of the fifth transistor is electrically connected to the driving output terminal.

A gate electrode of the sixth transistor is electrically connected to the second node, a first electrode of the sixth transistor is electrically connected to the driving output terminal, and a second electrode of the sixth transistor is electrically connected to the second clock signal terminal.

In at least one embodiment of the present disclosure, the sixth transistor is a p-type transistor, and a voltage value of the third voltage signal provided by the third voltage terminal is greater than a voltage value of the second voltage signal provided by the second voltage terminal; or, the sixth transistor is an n-type transistor, and a voltage value of the third voltage signal provided by the third voltage terminal is smaller than a voltage value of the second voltage signal provided by the second voltage terminal.

In a specific implementation, when the sixth transistor is a p-type transistor, the voltage value of the third voltage signal may be set to be greater than the voltage value of the second voltage signal, so that when the fifth transistor is turned on, the sixth transistor can be turned off.

When the sixth transistor is an n-type transistor, the voltage value of the third voltage signal can be set to be smaller than the voltage value of the second voltage signal, so that when the fifth transistor is turned on, the sixth transistor can be turned off.

Optionally, the energy storage circuit includes a storage capacitor.

A first terminal of the storage capacitor is electrically connected to the second node, and a second voltage terminal of the storage capacitor is electrically connected to the driving output terminal.

The driving circuit according to at least one embodiment of the present disclosure further includes a seventh transistor. The output circuit is electrically connected to the first node through the seventh transistor.

A gate electrode of the seventh transistor is electrically connected to a fourth voltage terminal, a first electrode of the seventh transistor is electrically connected to the first node, and a second electrode of the seventh transistor is electrically connected to the output circuit.

In a specific implementation, a normally-on seventh transistor may be provided between the first node and the output circuit to protect the first transistor and the second transistor.

Optionally, the seventh transistor may be a p-type transistor. A gate electrode of the seventh transistor may be electrically connected to the low voltage terminal, that is, the fourth voltage terminal may be a low voltage terminal, but is not limited thereto. In actual operation, the seventh transistor may also be an n-type transistor.

Figure 6:
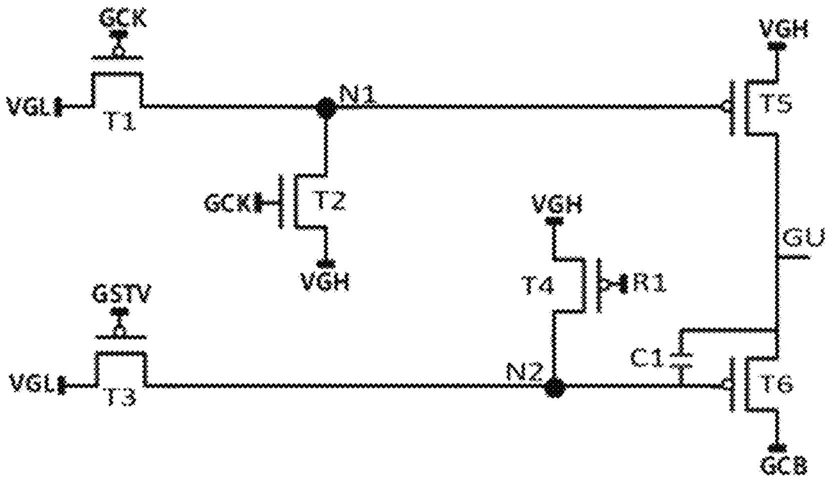
FIG. 6 is a schematic diagram of a driving circuit according to at least one embodiment of the present disclosure.

As shown in FIG. 6, on the basis of the embodiment of the driving circuit shown in FIG. 4, the first node control circuit includes a first transistor T1 and a second transistor T2.

A gate electrode of the first transistor T1 is electrically connected to the first clock signal terminal GCK, a source electrode of the first transistor T1 is electrically connected to a low voltage terminal VGL, and a drain electrode of the first transistor T1 is electrically connected to the first node N1.

A gate electrode of the second transistor T2 is electrically connected to the first clock signal terminal GCK, a source electrode of the second transistor T2 is electrically connected to a first high voltage terminal VGH, and a drain electrode of the second transistor T2 is electrically connected to the first node N1.

The second node control circuit includes a third transistor T3 and a fourth transistor T4.

A gate electrode of the third transistor T3 is electrically connected to the input terminal GSTV, a source electrode of the third transistor T3 is electrically connected to the low voltage terminal VGL, and a drain electrode of the third transistor T3 is electrically connected to the second node N2.

A gate electrode of the fourth transistor T4 is electrically connected to the first reset terminal R1, a source electrode of the fourth transistor T4 is electrically connected to the first high voltage terminal VGH, and a drain electrode of the fourth transistor T4 is electrically connected to the second node N2.

The output circuit includes a fifth transistor T5 and a sixth transistor T6.

A gate electrode of the fifth transistor T5 is electrically connected to the first node N1, a source electrode of the fifth transistor T5 is electrically connected to the first high voltage terminal VGH, and a drain electrode of the fifth transistor T5 is electrically connected to the driving output terminal GU.

A gate electrode of the sixth transistor T6 is electrically connected to the second node N2, a source electrode of the sixth transistor T6 is electrically connected to the driving output terminal GU, and a drain electrode of the sixth transistor T6 is electrically connected to the second clock signal terminal GCB.

The energy storage circuit includes a storage capacitor C1.

A first terminal of the storage capacitor C1 is electrically connected to the second node N2, and a second terminal of the storage capacitor C1 is electrically connected to the driving output terminal GU.

In at least one embodiment of the driving circuit shown in FIGS. 6, T1, T3, T4, T5, and T6 are all p-type transistors, and T2 is an n-type transistor.

The driving circuit in at least one embodiment of the present disclosure is designed for a low temperature polycrystalline oxide (LTPO) frame and is provided with a driving circuit for driving an oxide pixel circuit to support LTPO driving.

In at least one embodiment of the driving circuit shown in FIG. 6, the first reset terminal R1 is electrically connected to the driving output terminal of the adjacent next-stage driving circuit.

Figure 7:
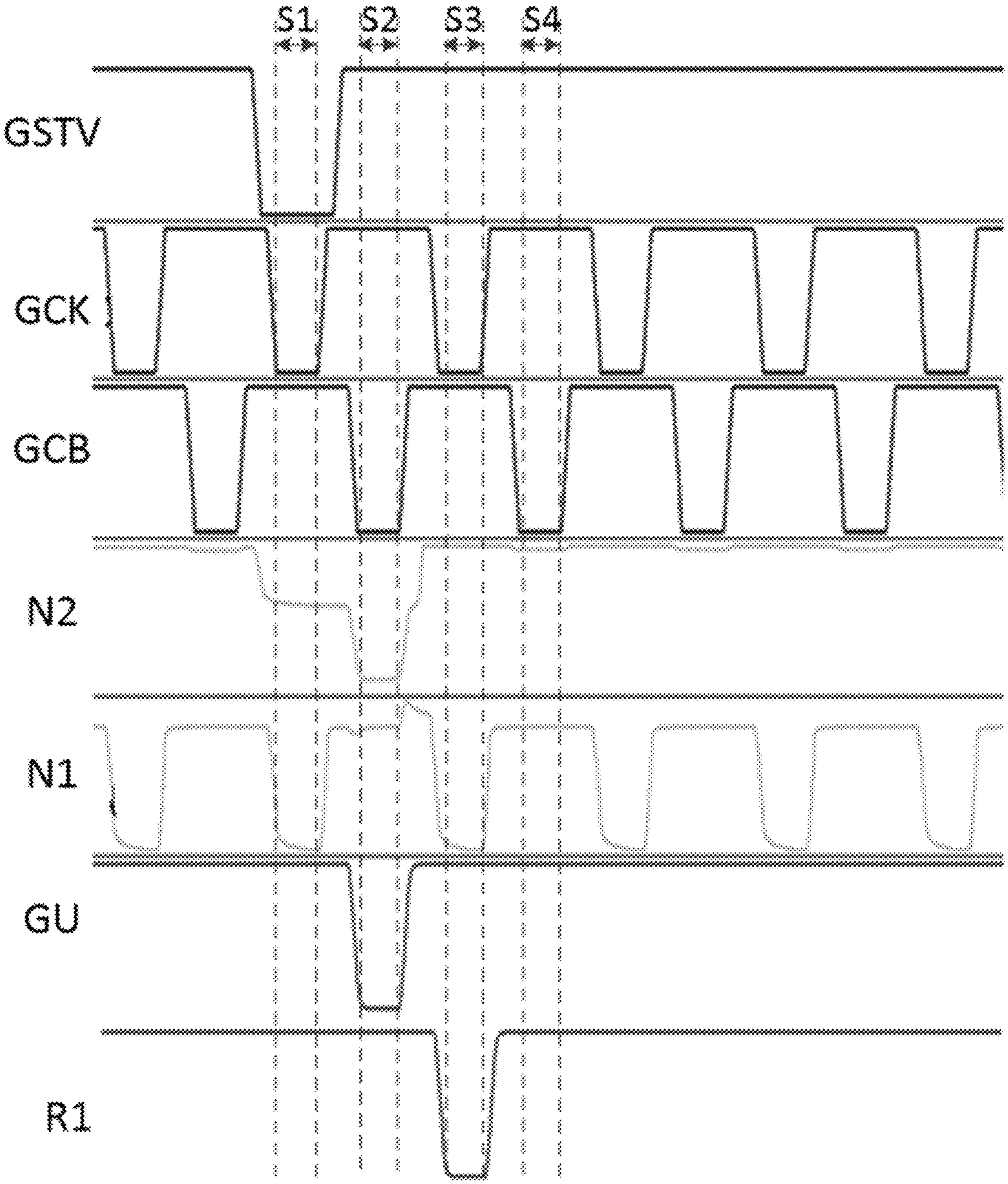
FIG. 7 is an operation timing diagram of at least one embodiment of the driving circuit shown in FIG. 6.

As shown in FIG. 7, when at least one embodiment of the driving circuit shown in FIG. 6 of the present disclosure is in operation, a driving cycle may include an input phase S1, an output phase S2, a reset phase S3, and a set phase S4, which are arranged in sequence.

Figure 8A:
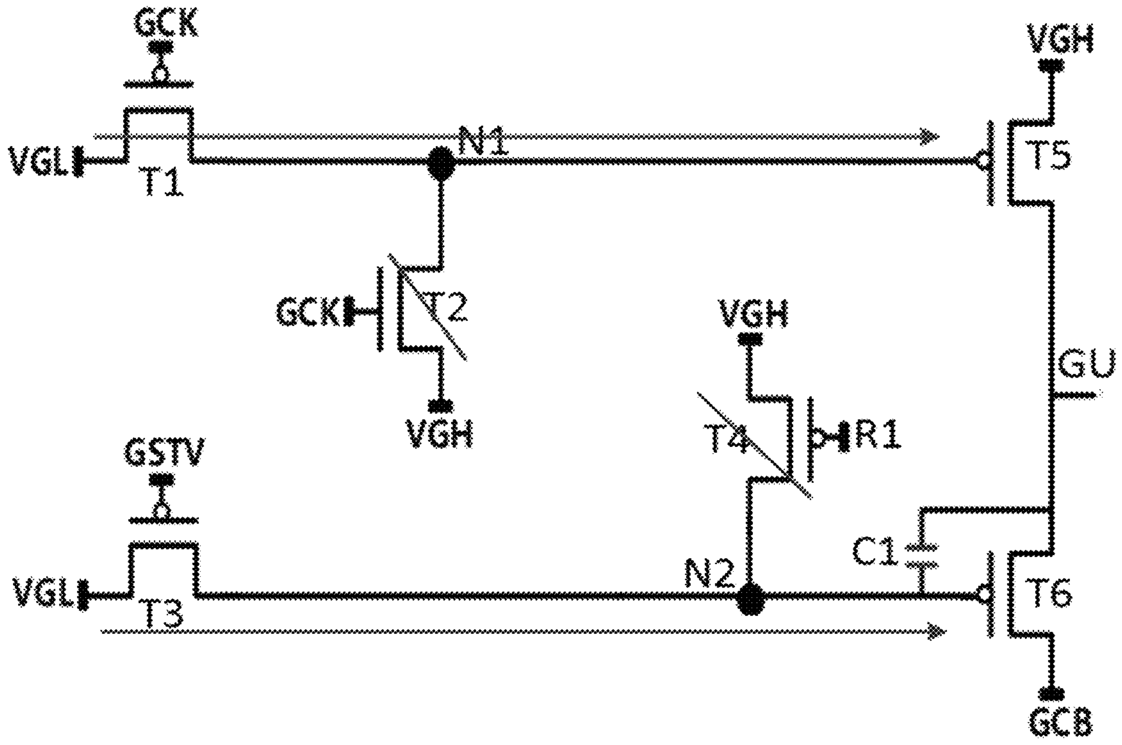
FIG. 8A is a schematic diagram of an operation state in an input phase of at least one embodiment of the driving circuit shown in FIG. 6.

In the input phase S1, GSTV provides a low voltage signal, GCK provides a low voltage signal, and GCB provides a high voltage signal; as shown in FIG. 8A, T1 is turned on, T2 is turned off, connection between the first node N1 and the low voltage terminal VGL is on, T5 is turned on, connection between GU and VGH is on; T3 is turned on, connection between the second node N2 and VGL is on, T6 is turned on, connection between GU and GCB is on; GU outputs a high voltage signal; R1 provides a high voltage signal, and T4 is turned off.

Figure 8B:
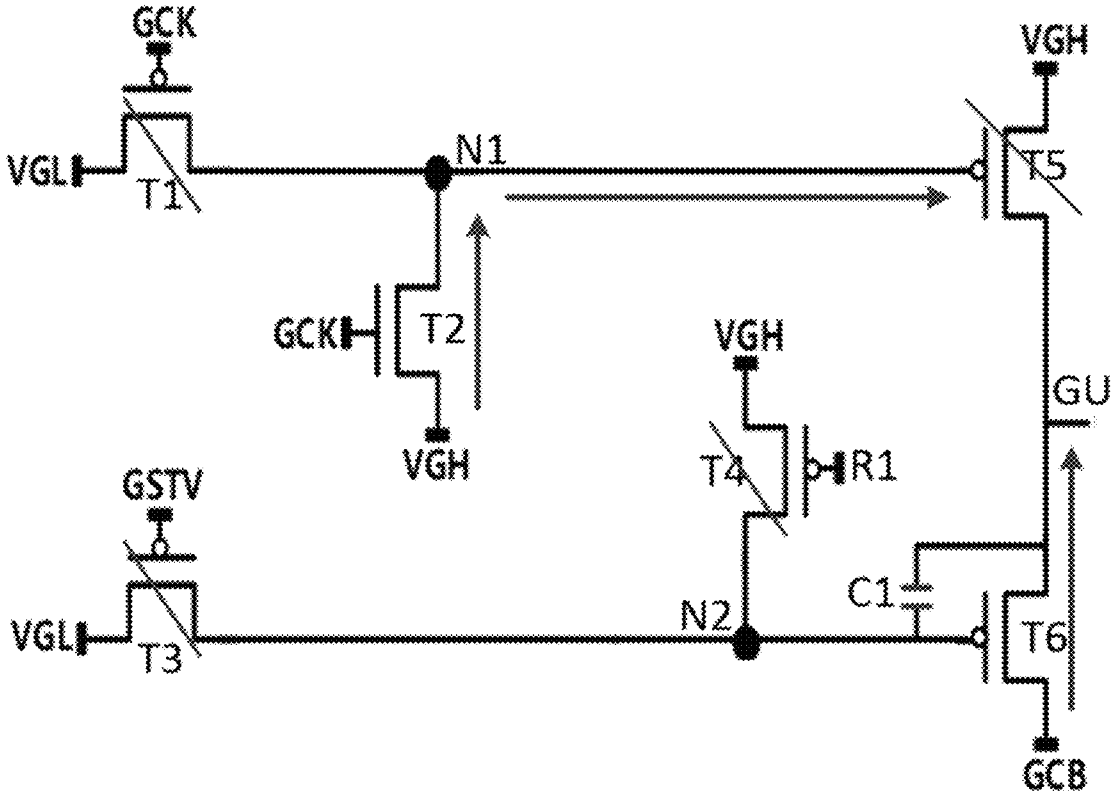
FIG. 8B is a schematic diagram of an operation state in an output phase of at least one embodiment of the driving circuit shown in FIG. 6.

In the output stage S2, GSTV provides a high voltage signal, GCK provides a high voltage signal, and GCB provides a low voltage signal; as shown in FIG. 8B, T1 is turned off, T2 is turned on, connection between the first node N1 and the first high voltage terminal VGH is on, and T5 is turned off; T6 is turned on, connection between GU and GCB is on, GU outputs a low voltage signal, and the potential of N2 is pulled down through C1; R1 provides a high voltage signal, and T4 is turned off.

Figure 8C:
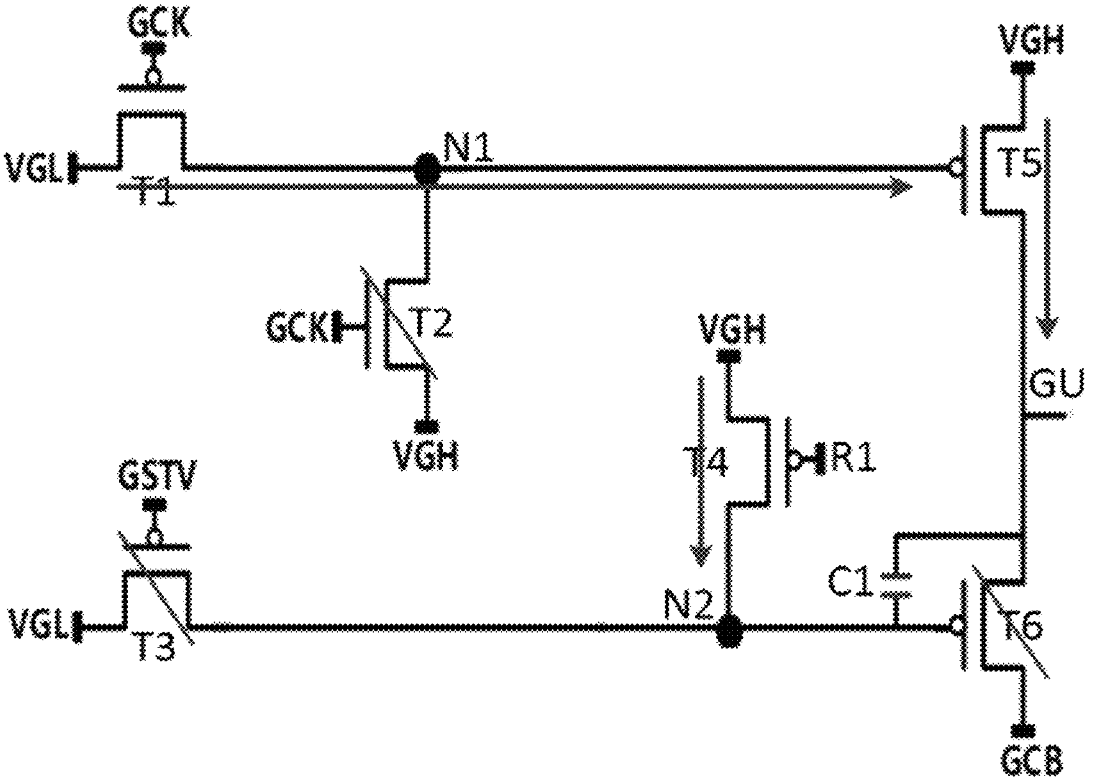
FIG. 8C is a schematic diagram of an operation state in a reset phase of at least one embodiment of the driving circuit shown in FIG. 6.

In the reset phase S3, GSTV provides a high voltage signal, GCK provides a low voltage signal, and GCB provides a high voltage signal; as shown in FIG. 8C, T1 is turned on, T2 is turned off, connection between the first node N1 and the low voltage terminal VGL is on, T5 is turned on, and GU outputs a high voltage signal; R1 provides a low voltage signal, T4 is turned on, connection between the second node N2 and VGH is on, and T6 is turned off.

Figure 8D:
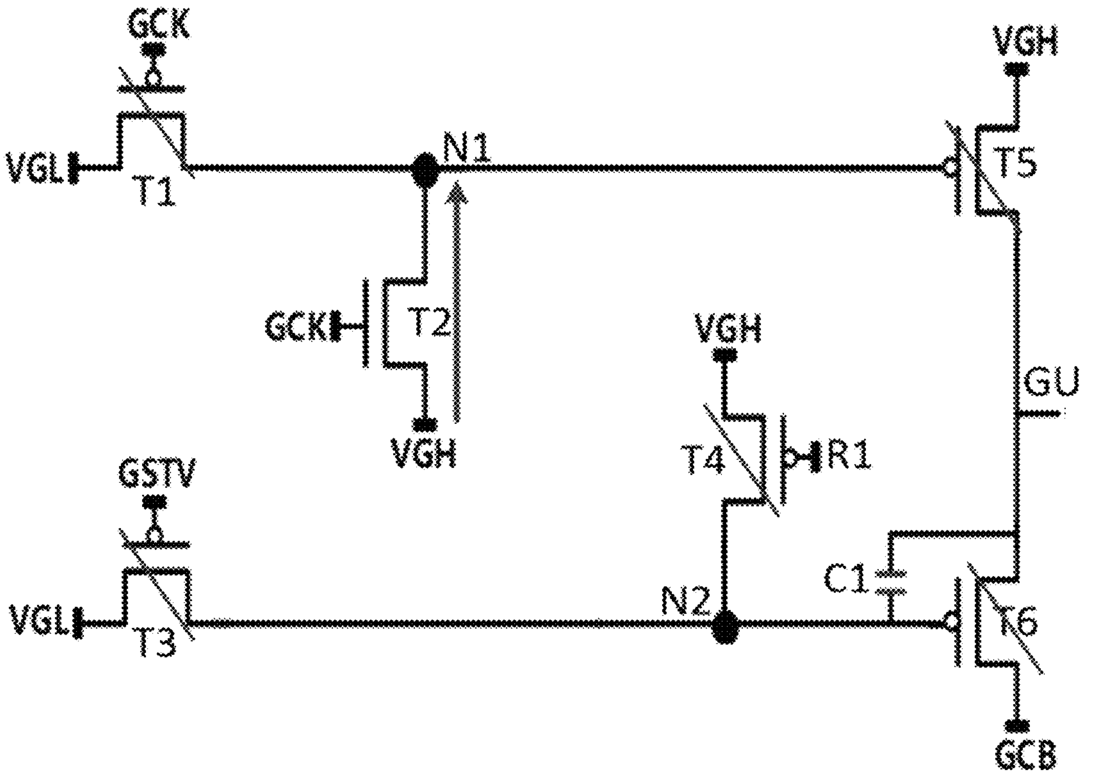
FIG. 8D is a schematic diagram of an operation state in a setting phase of at least one embodiment of the driving circuit shown in FIG. 6.

In the set stage S4, GSTV provides a high voltage signal, GCK provides a high voltage signal, and GCB provides a low voltage signal; as shown in FIG. 8D, T1 is turned off, T2 is turned on, connection between the first node N1 and VGH is on, T5 is turned off, T6 is turned off, and GU continues to output a high voltage signal; T3 is turned off, R1 provides a high voltage signal, and T4 is turned off.

By simulating at least one embodiment of the driving circuit shown in FIG. 6, when a threshold voltage is negatively biased by −3V to 2V, the rising time and falling time of the driving signal output by the driving circuit meet the requirements.

Figure 9:
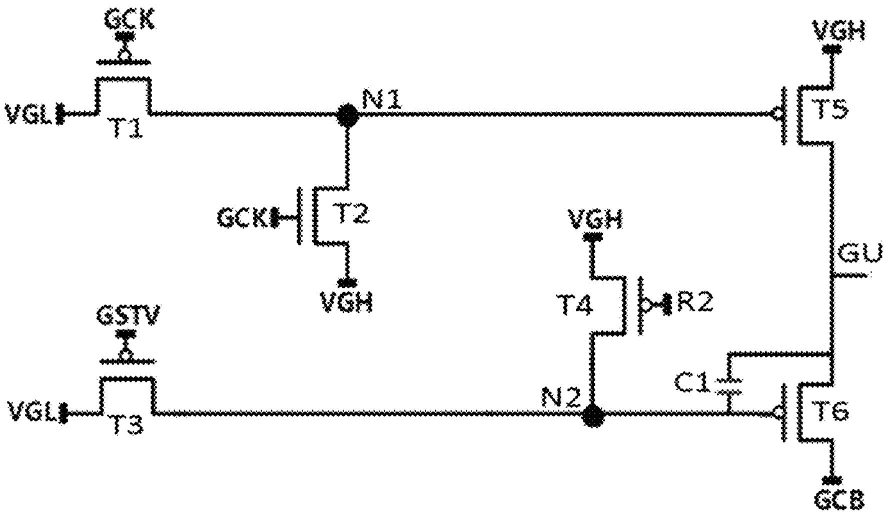
FIG. 9 is a circuit diagram of a driving circuit according to at least one embodiment of the present disclosure.

The difference between the at least one embodiment of the driving circuit shown in FIG. 9 and at least one embodiment of the driving circuit shown in FIG. 6 is that:

a gate electrode of T4 is electrically connected to the second reset terminal R2.

Figure 10:
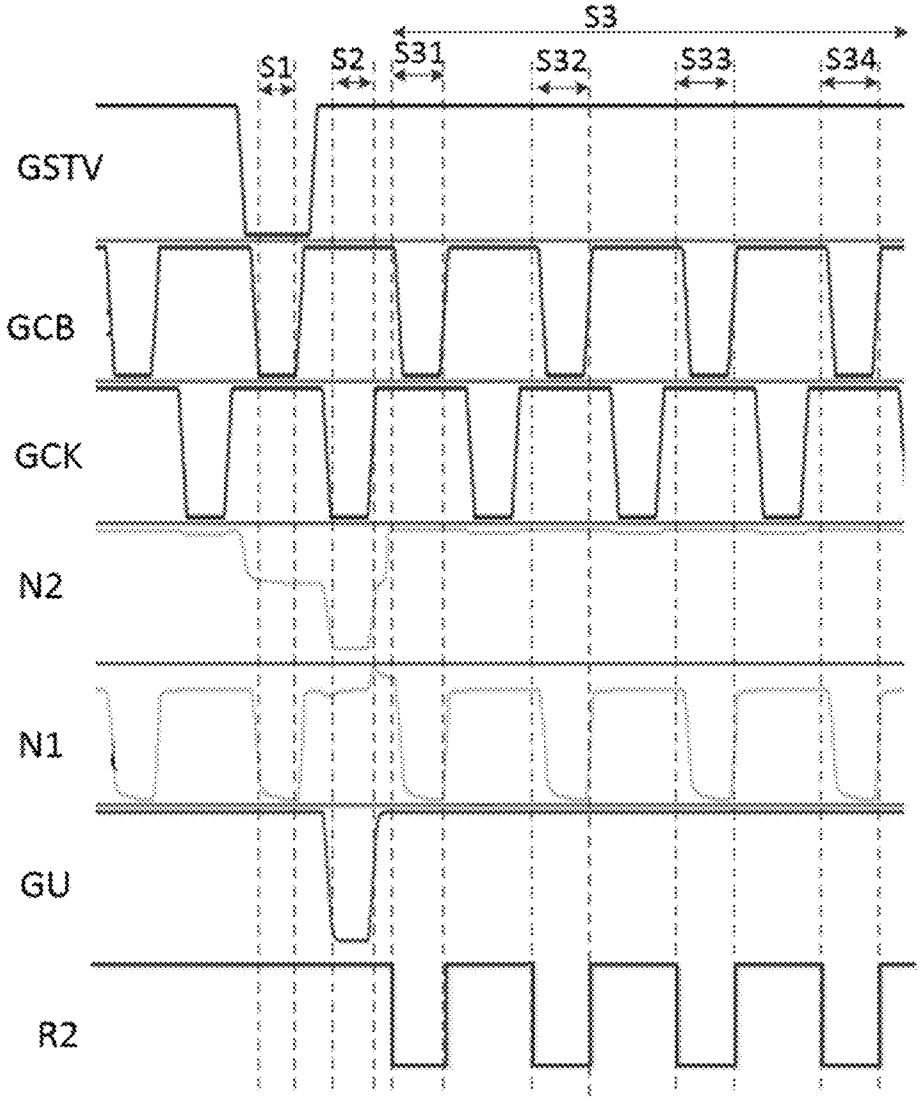
FIG. 10 is an operation timing diagram of at least one embodiment of the driving circuit shown in FIG. 9.

As shown in FIG. 10, when at least one embodiment of the driving circuit shown in FIG. 9 of the present disclosure is in operation, a driving cycle may include an input phase S1, an output phase S2, and a reset phase S3 which are arranged in sequence.

In the input phase S1, GSTV provides a low voltage signal, GCK provides a low voltage signal, GCB provides a high voltage signal, T1 is turned on, T2 is turned off, connection between the first node N1 and the low voltage terminal VGL is on, T5 is turned on, connection between GU and VGH is on; T3 is turned on, connection between the second node N2 and VGL is on, T6 is turned on, connection between GU and GCB is on; GU outputs a high voltage signal.

In the output phase S2, GSTV provides a high voltage signal, GCK provides a high voltage signal, GCB provides a low voltage signal, T1 is turned off, T2 is turned on, connection between the first node N1 and the first high voltage terminal VGH is on, T5 is turned off; T6 is turned on, connection between GU and GCB is on, GU outputs a low voltage signal, and the potential of N2 is pulled down through C1.

In the reset phase S3, GSTV provides a high voltage signal. When GCK provides a low voltage signal and GCB provides a high voltage signal, T1 is turned on, T2 is turned off, connection between the first node N1 and the low voltage terminal VGL is on, T5 is turned on, and GU outputs a high voltage signal.

In the reset stage S3, the second reset signal provided by R2 is a high-frequency reset signal. When R2 provides a low voltage signal, T4 is turned on, connection between the second node N2 and VGH is on, and T6 is turned off.

In FIG. 10, a first reset time period is labeled S31, a second reset time period is labeled S32, a third reset time period is labeled S33, and a fourth reset time period is labeled S34.

Figure 11:
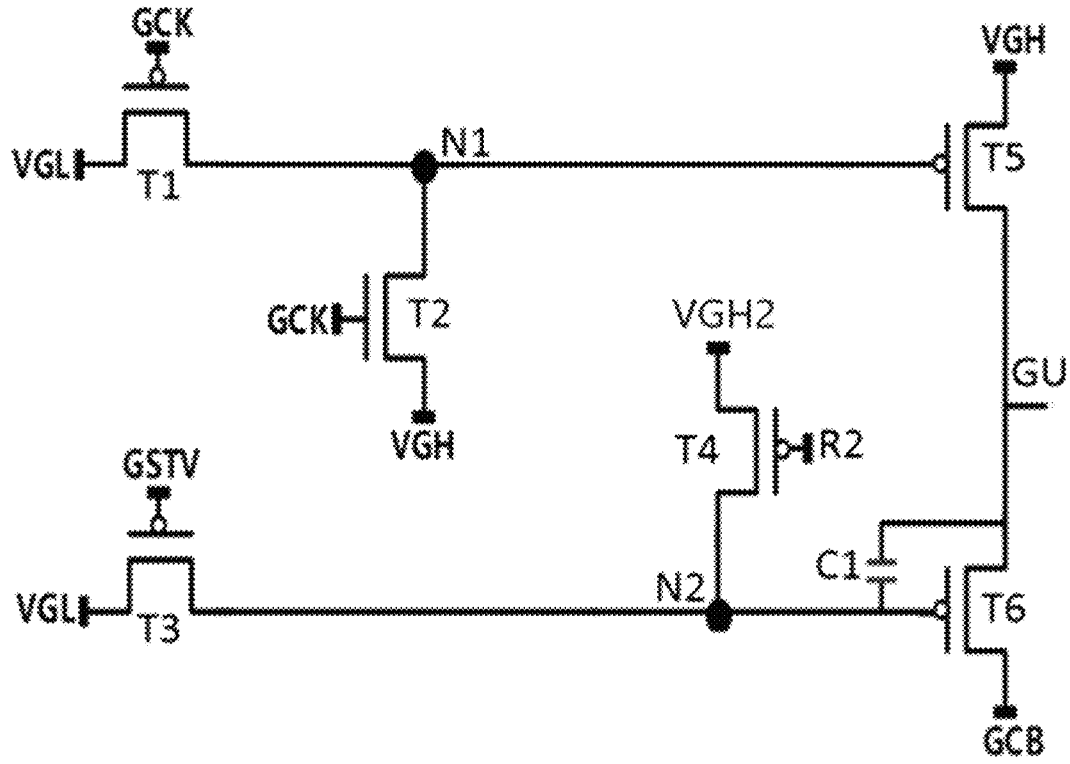
FIG. 11 is a circuit diagram of a driving circuit according to at least one embodiment of the present disclosure.

The difference between the at least one embodiment of the driving circuit shown in FIG. 11 and at least one embodiment of the driving circuit shown in FIG. 9 is that: a source electrode of T4 is electrically connected to the second high voltage terminal VGH2.

In at least one embodiment of the driving circuit shown in FIG. 11, a voltage value of a second high voltage signal provided by the second high voltage terminal VGH2 is greater than a voltage value of a first high voltage signal provided by the first high voltage terminal VGH, thereby ensuring that T6 can be turned off during the reset phase S3.

Figure 12:
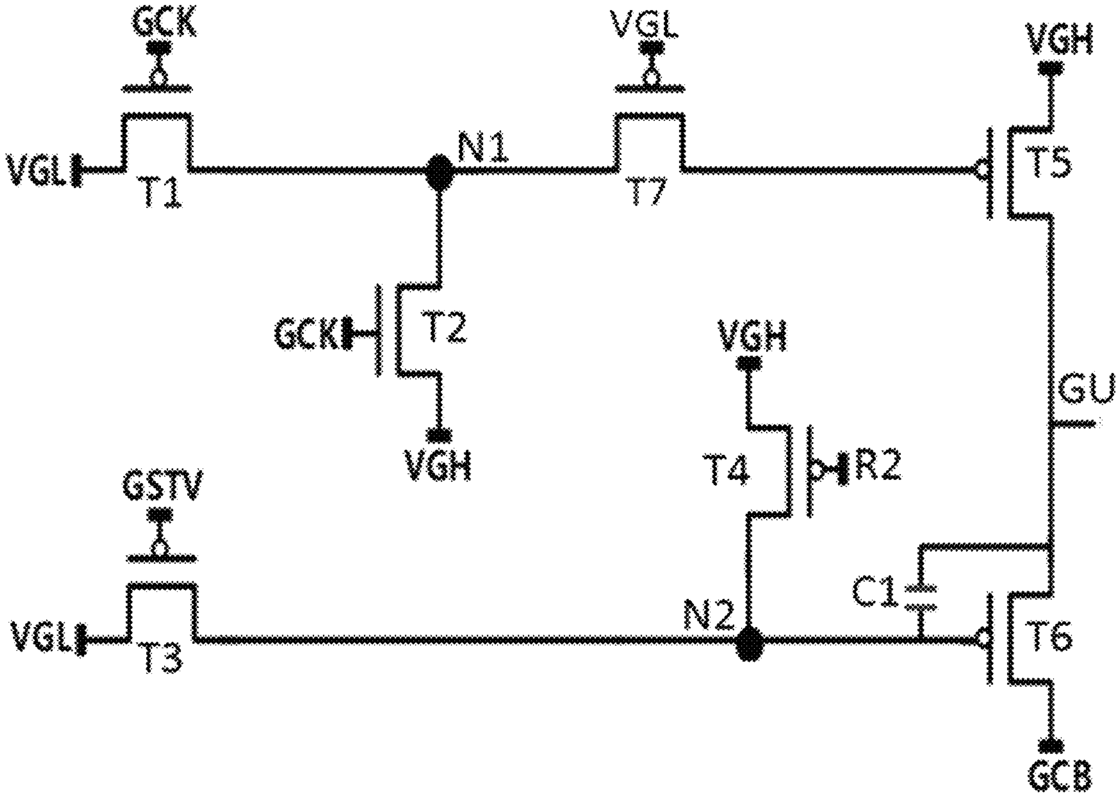
FIG. 12 is a circuit diagram of a driving circuit according to at least one embodiment of the present disclosure.

The difference between the at least one embodiment of the driving circuit shown in FIG. 12 and at least one embodiment of the driving circuit shown in FIG. 9 is that:

the at least one embodiment of the driving circuit shown in FIG. 12 further includes a seventh transistor T7.

A gate electrode of T7 is electrically connected to the low voltage terminal VGL, a source electrode of T7 is electrically connected to the first node N1, and a drain electrode of T7 is electrically connected to the gate electrode of T5.

In the at least one embodiment of the driving circuit shown in FIG. 12, T7 is a p-type transistor, and T7 is a normally-on transistor for protecting T1 and T2.

A driving method provided in one embodiment of the present disclosure is applied to the above driving circuit, and the driving method includes:

controlling, by the first node control circuit, under control of a first clock signal, connection between the first node and the first voltage terminal to be on; controlling, by the first node control circuit, under control of the first clock signal, connection between the first node and the second voltage terminal to be on;

controlling, by the second node control circuit, under control of an input signal, connection between the second node and the first voltage terminal to be on; controlling, by the second node control circuit, under control of a control signal, connection between the second node and the third voltage terminal to be on;

controlling, by the output circuit, under control of a potential of the first node and a potential of the second node, the driving output terminal to output a driving signal.

In at least one embodiment of the present disclosure, the step of controlling, by the output circuit, under control of a potential of the first node and a potential of the second node, the driving output terminal to output a driving signal, includes:

controlling, by the output circuit, under control of the potential of the first node, connection between the driving output terminal and the second voltage terminal to be on; controlling, by the output circuit, under control of the potential of the second node, connection between the driving output terminal and the second clock signal terminal to be on.

A display device provided in one embodiment of the present disclosure includes the above driving circuit.

The above is a preferred embodiment of the present disclosure. It should be pointed out that for those skilled in the art, several improvements and modifications can be made without departing from the principles described in the present disclosure. These improvements and modifications should also be regarded as falling in the protection scope of the present disclosure.

What is claimed is:

1. A driving circuit, comprising: a first node control circuit, a second node control circuit and an output circuit;

wherein the first node control circuit is electrically connected to a first node, a first clock signal terminal, a first voltage terminal and a second voltage terminal, respectively, and is used to, under control of a first clock signal provided by the first clock signal terminal, control connection between the first node and the first voltage terminal to be on, and is used to, under control of the first clock signal, control connection between the first node and the second voltage terminal to be on;

the second node control circuit is electrically connected to a second node, an input terminal, the first voltage terminal, a control terminal and a third voltage terminal, respectively, and is used to, under control of an input signal provided by the input terminal, control connection between the second node and the first voltage terminal to be on, and is used to, under control of a control signal provided by the control terminal, control connection between the second node and the third voltage terminal to be on; and the output circuit is electrically connected to the first node, the second node and a driving output terminal, respectively; and is used to, under control of a potential of the first node and a potential of the second node, control the driving output terminal to output a driving signal.

2. The driving circuit according to claim 1, wherein the output circuit is further electrically connected to a second voltage terminal and a second clock signal terminal, respectively, and is used to, under control of the potential of the first node, control connection between the driving output terminal and the second voltage terminal, and is used to, under control of the potential of the second node, control connection between the driving output terminal and the second clock signal terminal.

3. The driving circuit according to claim 1, further comprising an energy storage circuit;

wherein the energy storage circuit is electrically connected to the second node and the driving output terminal respectively, and is used to store electric energy.

4. The driving circuit according to claim 1, wherein the control terminal is a first reset terminal; the first reset terminal is electrically connected to adjacent next n-stage driving output terminals, and n is a positive integer.

5. The driving circuit according to claim 1, wherein the control terminal is a second reset terminal;

the second reset terminal is used to provide a valid voltage signal in at least two reset time periods included in a reset phase, thereby enabling the second node control circuit to control, under control of a second reset signal provided by the second reset terminal, the connection between the second node and the third voltage terminal to be on.

6. The driving circuit according to claim 1, wherein the first node control circuit includes a first transistor and a second transistor;

a gate electrode of the first transistor is electrically connected to the first clock signal terminal, a first electrode of the first transistor is electrically connected to the first voltage terminal, and a second electrode of the first transistor is electrically connected to the first node;

a gate electrode of the second transistor is electrically connected to the first clock signal terminal, a first electrode of the second transistor is electrically connected to the second voltage terminal, and a second electrode of the second transistor is electrically connected to the first node;

the first transistor is a p-type transistor, and the second transistor is an n-type transistor; or, the first transistor is an n-type transistor, and the second transistor is a p-type transistor.

7. The driving circuit according to claim 4, wherein the second node control circuit includes a third transistor and a fourth transistor;

a gate electrode of the third transistor is electrically connected to the input terminal, a first electrode of the third transistor is electrically connected to the first voltage terminal, and a second electrode of the third transistor is electrically connected to the second node;

a gate electrode of the fourth transistor is electrically connected to the first reset terminal, a first electrode of the fourth transistor is electrically connected to the third voltage terminal, and a second electrode of the fourth transistor is electrically connected to the second node.

8. The driving circuit according to claim 5, wherein the second node control circuit includes a third transistor and a fourth transistor;

a gate electrode of the third transistor is electrically connected to the input terminal, a first electrode of the third transistor is electrically connected to the first voltage terminal, and a second electrode of the third transistor is electrically connected to the second node;

a gate electrode of the fourth transistor is electrically connected to the second reset terminal, a first electrode of the fourth transistor is electrically connected to the third voltage terminal, and a second electrode of the fourth transistor is electrically connected to the second node.

9. The driving circuit according to claim 2, wherein the output circuit includes a fifth transistor and a sixth transistor;

a gate electrode of the fifth transistor is electrically connected to the first node, a first electrode of the fifth transistor is electrically connected to the second voltage terminal, and a second electrode of the fifth transistor is electrically connected to the driving output terminal;

a gate electrode of the sixth transistor is electrically connected to the second node, a first electrode of the sixth transistor is electrically connected to the driving output terminal, and a second electrode of the sixth transistor is electrically connected to the second clock signal terminal.

10. The driving circuit according to claim 9, wherein the sixth transistor is a p-type transistor, and a voltage value of a third voltage signal provided by the third voltage terminal is greater than a voltage value of a second voltage signal provided by the second voltage terminal; or, the sixth transistor is an n-type transistor, and a voltage value of a third voltage signal provided by the third voltage terminal is smaller than a voltage value of a second voltage signal provided by the second voltage terminal.

11. The driving circuit according to claim 3, wherein the energy storage circuit includes a storage capacitor;

a first terminal of the storage capacitor is electrically connected to the second node, and a second voltage terminal of the storage capacitor is electrically connected to the driving output terminal.

12. The driving circuit according to claim 1, further comprising a seventh transistor; wherein the output circuit is electrically connected to the first node through the seventh transistor;

a gate electrode of the seventh transistor is electrically connected to a fourth voltage terminal, a first electrode of the seventh transistor is electrically connected to the first node, and a second electrode of the seventh transistor is electrically connected to the output circuit.

13. A driving method, applied to the driving circuit according to claim 1, the driving method comprising:

controlling, by the first node control circuit, under control of a first clock signal, connection between the first node and the first voltage terminal to be on; controlling, by the first node control circuit, under control of the first clock signal, connection between the first node and the second voltage terminal to be on;

controlling, by the second node control circuit, under control of an input signal, connection between the second node and the first voltage terminal to be on; controlling, by the second node control circuit, under control of a control signal, connection between the second node and the third voltage terminal to be on;

controlling, by the output circuit, under control of a potential of the first node and a potential of the second node, the driving output terminal to output a driving signal.

14. The driving method according to claim 13, wherein the step of controlling, by the output circuit, under control of a potential of the first node and a potential of the second node, the driving output terminal to output a driving signal, includes:

controlling, by the output circuit, under control of the potential of the first node, connection between the driving output terminal and the second voltage terminal to be on; controlling, by the output circuit, under control of the potential of the second node, connection between the driving output terminal and the second clock signal terminal to be on.

15. A display device comprising: a driving circuit: wherein the driving circuit includes: a first node control circuit, a second node control circuit and an output circuit; wherein the first node control circuit is electrically connected to a first node, a first clock signal terminal, a first voltage terminal and a second voltage terminal, respectively, and is used to, under control of a first clock signal provided by the first clock signal terminal, control connection between the first node and the first voltage terminal to be on, and is used to, under control of the first clock signal, control connection between the first node and the second voltage terminal to be on; the second node control circuit is electrically connected to a second node, an input terminal, the first voltage terminal, a control terminal and a third voltage terminal, respectively, and is used to, under control of an input signal provided by the input terminal, control connection between the second node and the first voltage terminal to be on, and is used to, under control of a control signal provided by the control terminal, control connection between the second node and the third voltage terminal to be on; and the output circuit is electrically connected to the first node, the second node and a driving output terminal, respectively; and is used to, under control of a potential of the first node and a potential of the second node, control the driving output terminal to output a driving signal.

16. The display device according to claim 15, wherein the output circuit is further electrically connected to a second voltage terminal and a second clock signal terminal, respectively, and is used to, under control of the potential of the first node, control connection between the driving output terminal and the second voltage terminal, and is used to, under control of the potential of the second node, control connection between the driving output terminal and the second clock signal terminal.

17. The display device according to claim 15, wherein the driving circuit further includes: an energy storage circuit;

wherein the energy storage circuit is electrically connected to the second node and the driving output terminal respectively, and is used to store electric energy.

18. The display device according to claim 15, wherein the control terminal is a first reset terminal; the first reset terminal is electrically connected to adjacent next n-stage driving output terminals, and n is a positive integer.

19. The display device according to claim 15, wherein the control terminal is a second reset terminal:

the second reset terminal is used to provide a valid voltage signal in at least two reset time periods included in a reset phase, thereby enabling the second node control circuit to control, under control of a second reset signal provided by the second reset terminal, the connection between the second node and the third voltage terminal to be on.

20. The display device according to claim 15, wherein the first node control circuit includes a first transistor and a second transistor;

a gate electrode of the first transistor is electrically connected to the first clock signal terminal, a first electrode of the first transistor is electrically connected to the first voltage terminal, and a second electrode of the first transistor is electrically connected to the first node;

a gate electrode of the second transistor is electrically connected to the first clock signal terminal, a first electrode of the second transistor is electrically connected to the second voltage terminal, and a second electrode of the second transistor is electrically connected to the first node;

the first transistor is a p-type transistor, and the second transistor is an n-type transistor; or, the first transistor is an n-type transistor, and the second transistor is a p-type transistor.

* * * * *